Feb. 6, 1940.                G. W. SOWER                2,189,331
                METHOD AND APPARATUS FOR USE IN WELDING
                       Filed Dec. 13, 1938
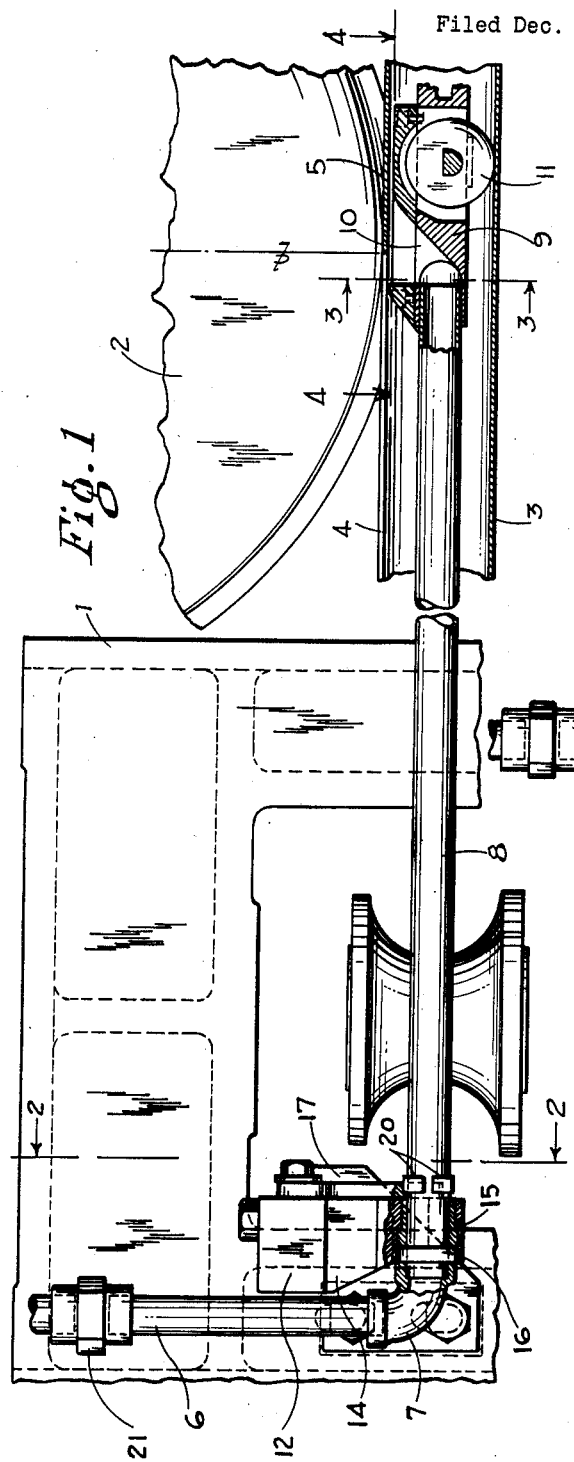
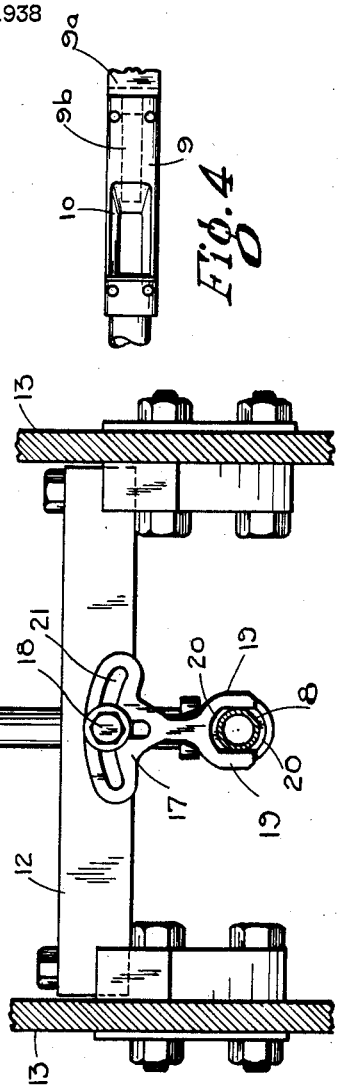
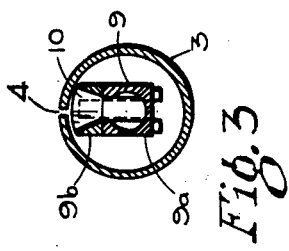
INVENTOR.
GEORGE W. SOWER
BY Richey & Watts
ATTORNEY.

Patented Feb. 6, 1940

2,189,331

UNITED STATES PATENT OFFICE 2,189,331

METHOD AND APPARATUS FOR USE IN WELDING

George W. Sower, Cleveland, Ohio, assignor, by mesne assignments, to Republic Steel Corporation, Cleveland, Ohio, a corporation of New Jersey Application December 13, 1938, Serial No. 245,443

7 Claims. (Cl. 219—6)

This invention relates to the art of making longitudinally welded tubular metal articles, such as tubing and pipe, and is particularly concerned with new and improved means and a new and improved method for collecting and congealing particles of molten metal which pass into the interior of such tubular article during welding, and removing such particles from the article.

While the present invention may be embodied in various forms of apparatus, it may be briefly described as comprising a hollow means having an opening thru which particles of molten metal formed during the welding operation may pass, means for maintaining the particle-receiving opening in a predetermined position with respect to the place where the particles of molten metal are produced, and means for causing a stream of fluid to flow thru the hollow means to congeal such particles of molten metal and to remove them from the articles being welded.

In the drawing accompanying and forming a part of this specification, in which is illustrated one form of apparatus embodying the invention and suitable for practicing the process thereof, Figure 1 is a fragmentary, partly sectional side elevational view showing a device of the present invention in combination with parts of a continuous, electric resistance, welding machine;

Figure 2 is a transverse fragmentary view, partly in section, taken on line 2—2 of Fig. 1;

Figure 3 is a transverse sectional view taken on line 3—3 of Figure 1; and

Figure 4 is a top plan view taken on line 4—4 of Figure 1.

In the drawing, I designates a part of the tube-forming portion of a welding machine of the electric resistance type, such for example, as is shown in United States Patent No. 1,388,434. 2 designates a part of one of the rotary welding electrodes of such a welder, and 3 designates tubing which has been formed by the forming portion of the welding machine, has an unwelded seam gap, as indicated at 4, and a completed weld as indicated at 5.

It will be understood that during the welding of the tubular article 3 by electrodes 2, particles of molten metal are formed and are projected from the weld into the tube along many different paths. Some of those particles make small pits or depressions in the inner surface of the tubing and some adhere to the inner surface. When the tubular article is to be used for certain purposes, particularly where an exceptionally smooth and uniform inner surface is required, or where subsequent operations are to be performed on the inner surface of the tubing, it is important that the particles should neither contact with nor adhere to such surfaces. Many efforts have been made to prevent such contact or adherence of these particles, but so far as I am informed none of the expedients proposed have been entirely satisfactory.

The present invention provides hollow means to be positioned within a tubular article while it is being welded to collect the particles of molten metal passing into the article at or near to the place of welding, and provides means for creating a swiftly moving stream of fluid to remove them from the tubing. The hollow means shown in the drawing consists of tubing parts 6, 7 and 8 and a hollow block 9 having an opening 10 through its top surface. This block 9 may, as shown, consist of a lower part 9a and an upper part 9b suitably secured together and may be provided with a supporting wheel 11 projecting below its lower surface to run on the lower, inner surface of the tubular article 3 and position the opening 10 closely adjacent to the upper, inner surface of the article 3 so as to insure that all particles of molten metal which pass into the interior of the article 3 will pass thru opening 10 into the interior of the block 9.

It will be understood that opening 10 is considerably wider than the seam gap 4 and may be several inches long, depending on the diameter of the tubular article and that there is a space on either side of block 9 which permits fluid currents to enter opening 10 from both sides. Such currents tend to draw into block 9, particles which otherwise might not enter opening 10.

The hollow means just described may be maintained in a predetermined position within the tubular article 3 by any suitable means. The means as shown in Figs. 1 and 2, for preventing lengthwise displacement of the hollow means, comprises a cross bar 12 secured to uprights 13 of the forming housing 1 and a bracket 14 secured to cross bar 12 and having an aperture extending therethru and provided with an internal, annular shoulder 15. A bearing is seated in this aperture and is provided with an outwardly extending, annular shoulder to seat against shoulder 15. The tube 8 extends thru the bearing and has a collar 16 near one end thereof to bear against the end of the bearing.

The means for preventing turning movement of the hollow means, as shown in Figs. 1 and 2, comprises a yoke 17 secured to cross bar 12, as by cap screw 18, and having fingers 19 which project on opposite sides of tube 8 and engage the flattened sides of blocks 20 which are secured to tube 8 in any suitable manner, for example, as by being welded thereto. The yoke 17 has an arc-shaped slot 21 to permit adjustment of pipe 8 on either side of a vertical plane thru cap screw 18.

Suitable suction means (not shown) are attached, as by union 21, to tube 6 for the purpose of creating a swift flow of fluid thru the hollow means comprising parts 6, 7, 8 and 9. A standard steam jet ejector connected to air or steam under pressure has been found to be satisfactory as a suction means, but a vacuum pump or the like may be used.

The operation of the above described apparatus is substantially as follows: Assuming that the tubular article 3 is being continuously formed and welded by the welding machine, and the hollow means is positioned substantially as shown with respect to the electrodes 2, the suction means is put in operation, thereby creating a swift flow of air thru opening 10 in block 9 and thence thru tubes 8, 7 and 6. Particles of molten metal which are formed at or adjacent to the point where the article 3 is being welded and which pass into the interior of the article, travel thru opening 10. When these particles come into contact with the stream of air they are more or less promptly congealed and are then carried thru tubes 8, 7 and 6 to a point of discharge outside of the article 3. In this manner the particles of molten metal are prevented from coming into contact with the inner surfaces of the article 3 and are also prevented from clogging the hollow means.

Having thus described the present invention so that those skilled in the art may be able to understand and practice it, I state that what I desire to secure by Letters Patent is defined in what is claimed.

What is claimed is:

1. The method of making welded tubular articles which comprises the steps of welding together the longitudinal edges of such an article, and, during such welding operation, collecting, before they contact with the inner surface of the article, particles which are formed from the article during the welding operation and which pass into the interior of the article, congealing said particles, and removing said particles in a stream of swiftly moving fluid.

2. The method of making welded tubular articles which comprises the steps of continuously welding together the longitudinal edges of such an article, and, during such welding operation, collecting, before they contact with the inner surface of the article, particles which are formed from the article during the welding operation and which pass into the interior of the article, congealing said particles, and removing said particles in a stream of swiftly moving fluid flowing in a direction opposite to the travel of the article.

3. The combination with a welding machine for welding together the opposed, longitudinal edges of a tubular metal article at a place of short axial length, of hollow means within such an article and having a top opening of greater size than said place of welding to receive particles of molten metal entering said article from the place of welding, means cooperating with said hollow means to maintain said opening beneath said place of welding and closely adjacent to the upper inner surface of said article, and means associated with said hollow means to move thru said hollow means particles of metal which pass thru said opening at the place of welding.

4. The combination with a welding machine having rotary electrodes to weld together the opposed longitudinal edges of a tubular metal article at a place of short axial length beneath and between said electrodes, of hollow means within such an article and having a top opening which is longer and wider than said place of welding to receive particles of molten metal entering said article from the place of welding, means cooperating with said hollow means to maintain said opening beneath said place of welding and closely adjacent to the upper inner surface of said article, and means associated with said hollow means to draw thru said opening and to move thru said hollow means particles of metal released at the place of welding.

5. Apparatus of the class described comprising hollow means disposable within a tubular article whose longitudinal edges are being welded together at a place of short length axially thereof, said hollow means having a top opening of greater length and breadth than said place of welding to receive particles of molten metal entering said article from the place of welding, means cooperating with said hollow means to maintain said opening beneath said place of welding and closely adjacent to the upper inner surface of said article, and means associated with said hollow means to draw thru said opening and to move thru said hollow means particles of metal released at the place of welding.

6. Apparatus of the class described comprising hollow means disposable within a tubular article whose longitudinal edges are being welded together at a place of short length axially thereof, said hollow means having a top opening of greater size than said place of welding to receive particles of molten metal entering said article from the place of welding, means cooperating with said hollow means to maintain said opening beneath said place of welding and closely adjacent to the upper inner surface of said article, and suction means associated with said hollow means to move thru said hollow means particles of metal which are released at the place of welding and pass thru said opening.

7. Apparatus of the class described comprising hollow means within a tubular article whose longitudinal edges are being welded together at an axially short place of welding, said hollow means having a top opening of greater size than said place of welding to receive particles of molten metal entering said article from the place of welding, means cooperating with said hollow means to maintain said opening beneath said place of welding and closely adjacent to the upper inner surface of said article, and means associated with said hollow means to create a swift flow of fluid therethru in a direction opposite to the direction of travel of said article to move thru said hollow means particles of metal which are released at the place of welding and pass thru said opening.

GEORGE W. SOWER.